United States Patent [19]
White et al.

[11] Patent Number: 5,107,887
[45] Date of Patent: Apr. 28, 1992

[54] HIGH PRESSURE FLUID REGULATOR

[75] Inventors: Lawrence W. White; Gabriel J. Pietrykowski, both of Bryan; John P. Altman, Edgerton, all of Ohio

[73] Assignee: The Aro Corporation, Bryan, Ohio

[21] Appl. No.: 620,766

[22] Filed: Dec. 3, 1990

[51] Int. Cl.[5] ............................................. F16K 16/08
[52] U.S. Cl. .................................... 137/505.42; 251/331
[58] Field of Search .................. 137/505.41, 505.42; 251/331, 368

[56] References Cited

U.S. PATENT DOCUMENTS

| | | | |
|---|---|---|---|
| 1,712,697 | 5/1929 | Frankenberg | 137/505.42 |
| 1,946,188 | 2/1934 | Birch | 137/505.41 |
| 3,045,691 | 7/1962 | Young | 137/505.42 X |
| 3,782,858 | 1/1974 | Deters | 137/505.41 X |
| 3,812,877 | 5/1974 | Fleishhacker et al. | 137/505.42 |
| 3,982,559 | 9/1976 | Ochs | 251/368 X |
| 4,246,931 | 1/1981 | O'Connor | 137/505.41 X |
| 4,776,368 | 10/1988 | Drozd | 137/505.41 X |
| 4,887,639 | 12/1989 | Lewis et al. | 137/505.41 |

Primary Examiner—Stephen M. Hepperle
Attorney, Agent, or Firm—Robert F. Palermo

[57] ABSTRACT

A fluid pressure regulator provides features which enable an extended regulator life in high pressure service. Dual flexible diaphragms provide chemical resistance in contact with the working fluid and abrasion and fatigue resistance in contact with a backup plate and piston assembly. The backup plate has a bore which is sufficiently long and close fitting with the piston so that axial alignment is assured and there is minimal tendency for the piston to become cocked within the bore. Provision is also made for preventing fretting corrosion between the piston and the backup plate by coating at least one of the surfaces, if necessary, to assure that dissimilar metals only are in contact in that couple. Seals between the regulator housing body and the diaphragm and between the valve stem and diaphragm may be provided by resilient seal rings or by annular protrusions integrally formed on one or both of the diaphragms.

3 Claims, 5 Drawing Sheets

HIGH PRESSURE FLUID REGULATOR

BACKGROUND OF THE INVENTION

This invention relates generally to fluid handling and more particularly to high pressure fluid pressure regulation.

Dispensing fluids for industrial applications requires accurate control of pressure in order to provide accurate distribution of the fluids in the process. For paints, adhesives, and other high viscosity fluids, distribution pressures of approximately 3,000 psi are frequently required. This has become increasingly true as suppliers of these fluids have minimized the solvent content of these mixtures in response to demands for reduction in health and fire hazards in the workplace. As solvent contents have decreased, the abrasive nature of the suspended solids has become more significant and has begun to adversely affect the service life of the fluid pressure regulators employed in the system.

Typically, a fluid pressure regulator consists of an inlet, an outlet, and a valve placed in the connecting path between the inlet and outlet. A valve closure element is usually biased against the valve seat and is controlled by a stem or other mechanism which is, in turn, adjustably biased counter to the closure element by means of a spring acting on a diaphragm and/or piston which enables the regulator to maintain a constant outlet pressure despite fluctuations in inlet pressure. The piston is adjustably spring biased and is reciprocable within a cylindrical bore in the regulator cover plate. Without a diaphragm, the bore requires a circumferential lip seal in order to prevent leakage of the fluid between the piston and the bore. To function properly against such a seal, the piston requires a very fine finish of the order of 10 microinches or less. Such a finish is expensive to produce and is very easily damaged by corrosion or mechanical injury. Moreover, in the presence of highly abrasive low solvent suspensions, both the seal and the piston finish deteriorate due to sliding contact.

For high pressures, a combination of diaphragm with piston provides more positive sealing. Durability of the diaphragm compared to the lip seal is generally superior since the diaphragm is exposed to flexure rather than sliding wear.

Reduction of solvent content has increased the viscosity of the working materials so that they require higher pumping pressures and, consequently, regulators designed for those pressures. Regulators which were designed to perform in the range of 1000 psi to 1500 psi experienced short service life using the high solids/low solvent materials presently available. Increasing wall thicknesses and spring stiffness alone is not sufficient to upgrade a medium pressure regulator for use in the 3000 psi range of service pressures commonly encountered.

Typically, high pressure regulators employ a diaphragm as well as a piston in a bore of the from cutting, the edges of the piston and the bore of the backup plate are commonly given a radius. The diaphragm commonly consists of fabric mesh reinforced rubber for flexibility and a layer, bonded onto the pumped fluid side, of a chemically resistant material. "O" ring seals are commonly used between the diaphragm, the stem, and the regulator housing.

These features are illustrated in FIG. 1 which presents a cross sectional view of the diaphragm/ piston interfacial area of a typical prior art regulator. The stem 6 and the piston 5 are bolted together to capture the one piece bonded diaphragm 1 and "O" ring seal 7 between them. Diaphragm 1 is composed of fabric reinforced rubber layer 3 and chemical resistant layer 2. Piston 5 reciprocates within bore 8 of backup plate 4. For ease of assembly, chamfer 11 is provided as well as the relatively loose fit between bore 8 and piston 5 which are also radiused as previously described. "O" ring 9 provides a seal between diaphragm 1 and housing 14.

In high pressure surface, this regulator will potentially experience the following problems:

1. the short guide length of the bore between the chamfer and radius on the backup plate can allow the piston to cock slightly within the bore, and can thus permit localized high pressure contact between piston and backup plate and nonuniform flexure of the diaphragm;

2. the large gap, behind the diaphragm, provided by the radii of the backup plate and the piston, allows wedging of the diaphragm into the large gap and consequent excessive abrasion and flexural wear on the diaphragm;

3. the relatively thin backup plate is subject to slight deflection due to high pressure and thus leakage of the working fluid around the seal between the housing and the diaphragm;

4. the one piece bonded diaphragm, because of the different flexural moduli of the two layers, experiences intensified local stresses which cause early failure;

5. in cases where a resonance causes vibration of the piston within the backup plate bore, fretting corrosion may become a significant problem and thus exacerbate the other shortcomings of this design in a high pressure application.

The foregoing illustrates limitations known to exist in present fluid pressure regulators when used in high pressure applications. Thus, it is apparent that it would be advantageous to provide a alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid pressure regulator which has a body with a fluid inlet, a fluid outlet, and a fluid passage communicating therebetween; a variable valve positioned within the fluid passage and having an orificed-seat and a closure element biased toward said orificed-seat; provision for adjusting the clearance between the seat and the closure element in order to control fluid outlet pressure; and first and second separate, imperforate, radially coextensive diaphragms in mutual flat surface contact, for maintaining a substantially constant outlet pressure which is independent of fluctuations in fluid inlet pressure.

The foregoing and other aspects will become apparent from the following detailed description of the invention when considered in conjunction with the accompanying drawing figures.

BRIEF DESCRIPTION OF THE DRAWING FIGURE

DETAILED DESCRIPTION

Figure 1:
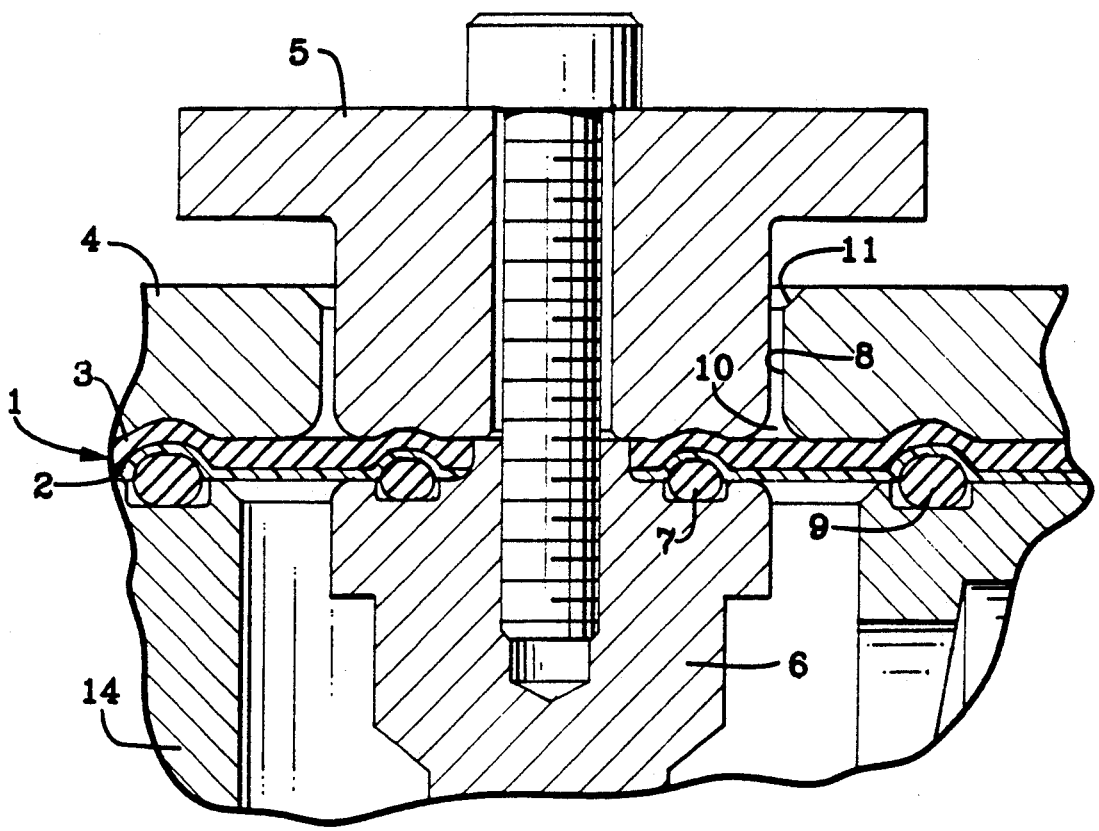
FIG. 1 is a fragmentary cross sectional view which illustrates features of fluid pressure regulators of the prior art.

FIG. 1 has already been described in the discussion of the prior art. It illustrates the features of a regulator which is suitable for use in low to medium pressure applications but has shortcomings previously described when used in high pressure applications.

Figure 2:
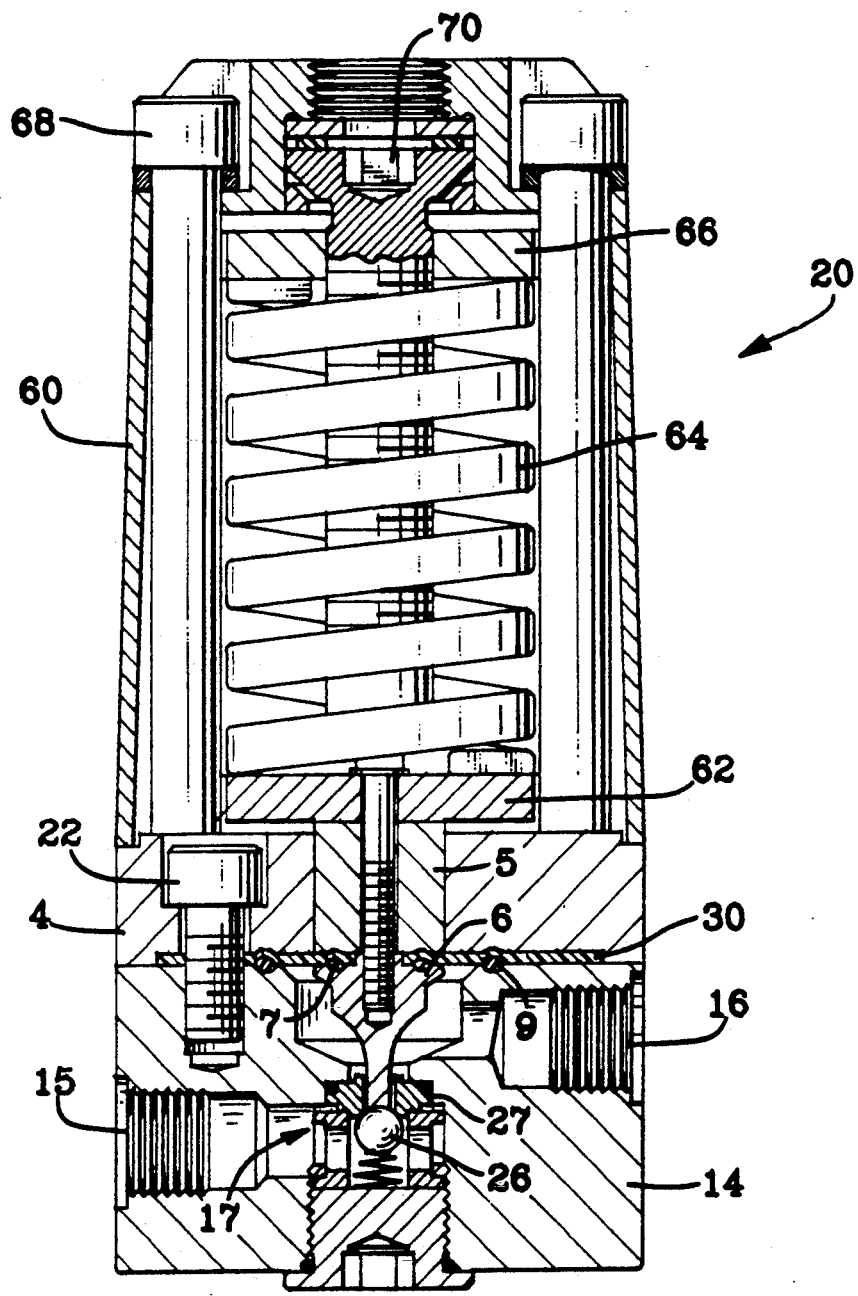
FIG. 2 is an elevation cross section of the high pressure fluid regulator of the present invention.

FIG. 2 shows a high pressure regulator 20 of the present invention. It comprises a housing body 14, a housing cover which also serves as diaphragm backup plate 4, a bonnet 60, a diaphragm tensioning spring 64 bounded at the top and bottom by spring keepers 66 and 62, bonnet bolts 68, and adjusting screw 70. Bonnet bolts 68 secure bonnet 60 through diaphragm backup plate 4 and are threaded into housing body 14. Plate 4 is also secured to housing body 14 by backup plate bolts 22 Piston 5 is secured to spring keeper 62 and to stem 6 such that diaphragm 30 is trapped between piston 5 and stem 6. "O" rings 7 and 9 provide fluid seals between the diaphragm assembly 30 and stem 6 and diaphragm assembly 30 and housing body 14, respectively. "O" rings are used in this example but it should be understood that any appropriate seal ring arrangement is satisfactory.

High pressure fluid enters the regulator through inlet 15, passes through variable valve 17 which comprises closure element 26 and valve seat 27, passes around stem 6 and exits through outlet 16. Pressure regulation is accomplished by turning adjusting screw 70 to compress diaphragm tensioning spring 64. This drives spring keeper 66 downward so as to increase the spring pressure on spring keeper 62 which forces piston 5 and rigidly connected stem 6 downward to displace closure element 26 from seat 27, thus opening variable valve 17. The system pressure downstream of valve 17 is inversely proportional to the amount of pressure drop through valve 17. This downstream pressure acts upon diaphragm 30 and piston 5 to force them upward counter to the direction of force exerted by diaphragm tensioning spring 64. Thus, after a very brief "hunting" interval, the two opposing forces are balanced and steady state operation is achieved. So long as the inlet pressure remains constant, and so long as the outlet demand remains constant, the positions of all these movable elements remain stationary. Should inlet pressure decrease, the resulting decrease in downstream pressure will cause piston and stem to move downward, thereby further opening valve 17 and restoring the outlet pressure to the set point. The converse is true for increases of inlet pressure as well. Desired pressures are set by turning adjusting screw 70 to force upper spring keeper 66 downward to increase pressure and to pull keeper 66 upward to decrease pressure.

Figure 3:
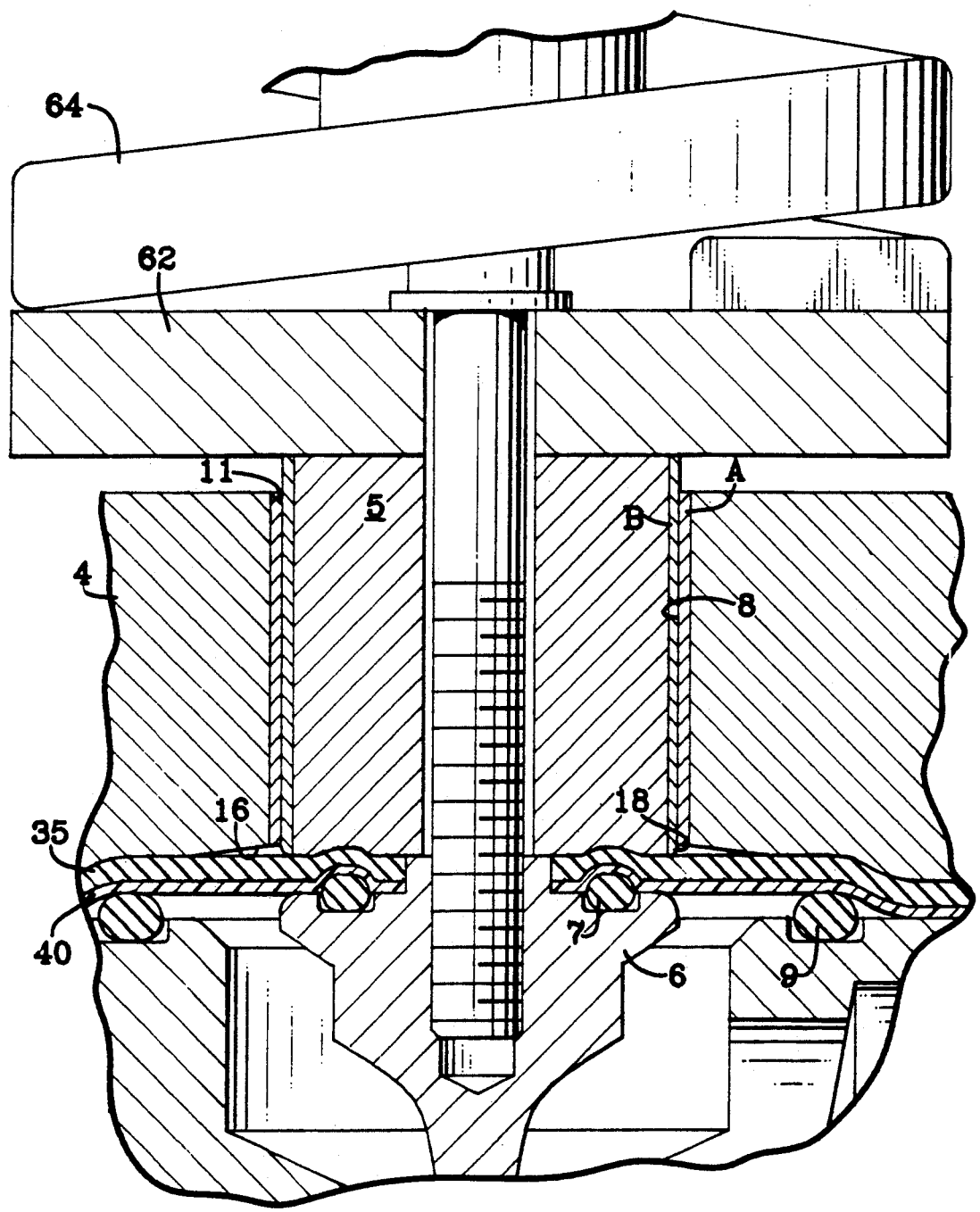
FIG. 3 is a fragmentary cross sectional view to illustrate detail of the critical features of the present invention.

FIG. 3 is a fragmentary enlarged partially sectional view showing greater detail of critical elements of the present invention. It is now apparent that diaphragm assembly 30 comprises a backup member which is a flexible elastomeric diaphragm 35 lying against the piston 5 and backup plate 4, and a chemically resistant diaphragm 40 lying against flexible diaphragm 35 and shielding it from any corrosive properties of the working fluid. It should be noted that diaphragms 35 and 40 are not bonded together but are radially coextensive and in mutual flat surface contact with each other. This nonbonded contact improves the flexibility of the diaphragm assembly by permitting limited slippage between the diaphragms during flexure. This reduces the tensile and compressive stresses experienced by the diaphragm surfaces and, thus, improves the fatigue lives of the diaphragms. The gently tapered relief 16 on backup plate 4 around the circumference of bore 8 together with small radius 18 on piston 5 combined to produce a very small gap behind diaphragm 35, and they thus permit the diaphragm to flex over a longer distance and, thus, to flex less sharply. Note that chamfer 11 is still provided for ease of assembly. However, the fit of piston 5 within the bore in backup plate 4 is sufficiently close so that, when combined with the larger guide length resulting from increasing the thickness of diaphragm backup plate 4, there is virtually no tendency for the piston to cock in the bore. This eliminates damage caused by nonuniform flexing and by misalignment of regulator components.

Coating A on the bore of backup plate 4 and coating B on the lateral circumferential surface of piston 5 are provided to ensure that surfaces which may be subject to vibratory oscillation against each other are not of the same metal. This reduces the tendency for fretting corrosion to occur, thereby extending the service life of the piston 5 and of the backup plate 4. It should be noted that it is not necessary to coat both surfaces in order to satisfy the different metal requirement. For example, if piston 5 were made of steel and backup plate 4 were made of bronze, the different metal requirement would be met. If, however, both were made of bronze or both were made of steel, it would be desirable to coat one or the other to eliminate the fretting corrosion problem. Depending on the circumstances, coatings such as hard chromium electroplate, nickel electroplate, electroless nickel, or other relatively hard plated surfaces may be used. By avoiding the use of similar metals or soft metals on the contacting surfaces the tendency toward fretting corrosion due to reciprocating or oscillating vibratory motion under high pressures at the contact surfaces will be reduced and service life of the regulator improved.

Finally, the increased thickness of backup plate 4 reduces the tendency of the backup plate to deflect under pressure and thereby prevents initiation of leakage past "O" ring seal 9 between diaphragm 40 and the housing body. This freedom from deflection also contributes to the alignment stability of the piston which was earlier discussed from the viewpoint of improved guide length.

Figure 4:
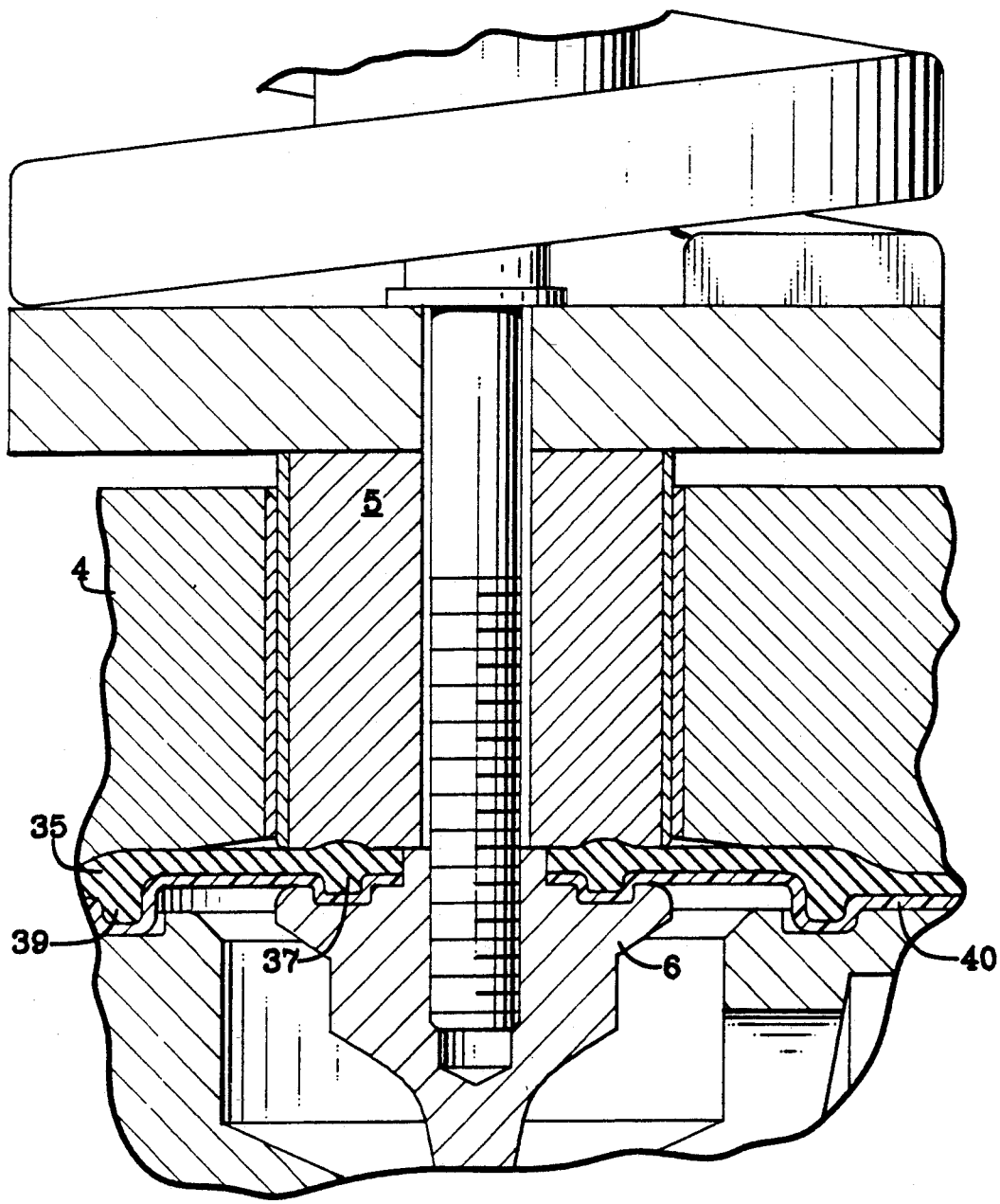
FIG. 4 is a cross sectional view which presents an alternative embodiment of the diaphragm of the present invention.
Figure 5:
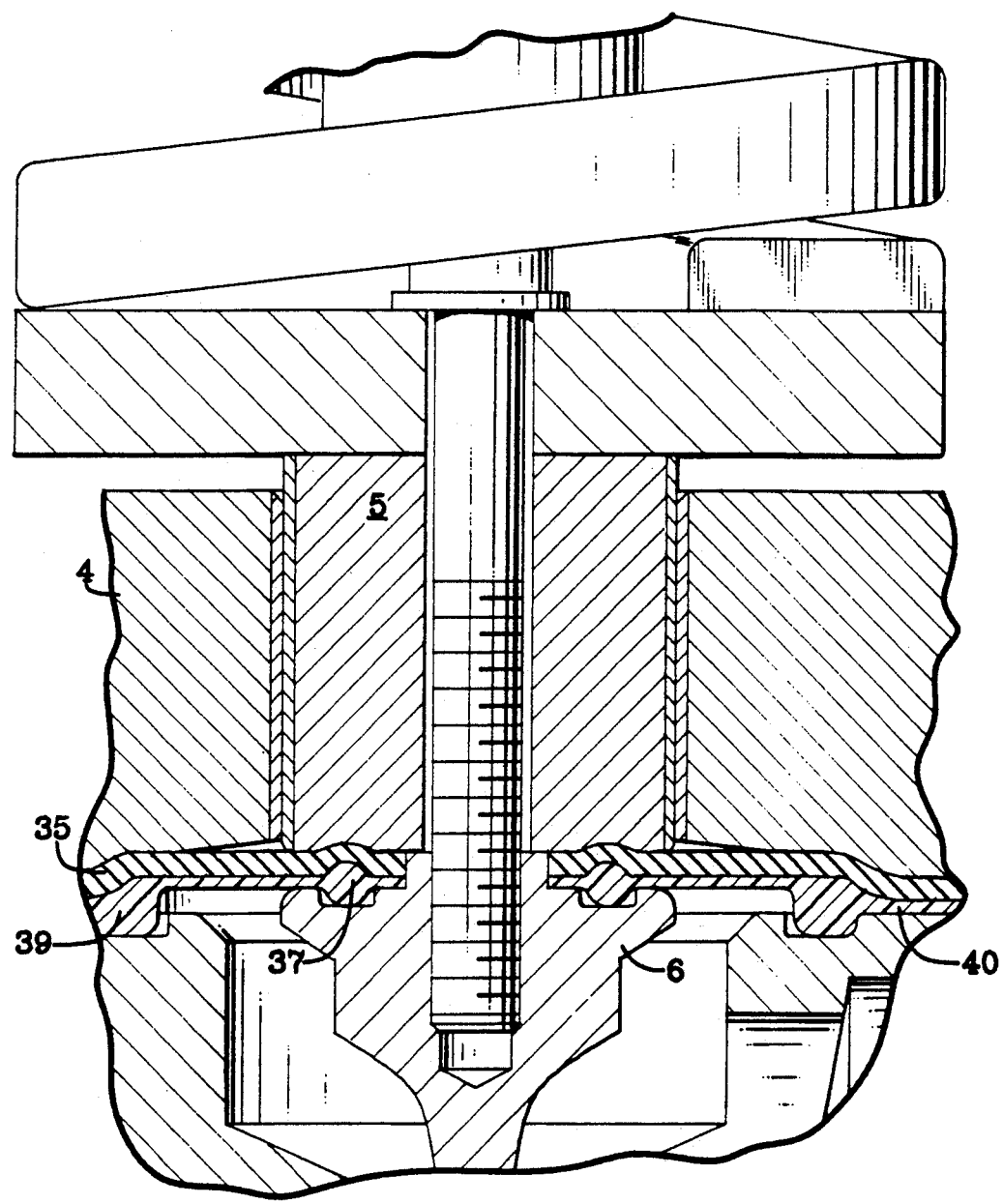
FIG. 5 is a fragmentary cross sectional view which presents a variant of the diaphragm shown in FIG. 4.

FIGS. 4 and 5 are fragmentary sectional views to show detail of two alternative diaphragm designs which incorporate integral "O" rings. FIG. 4 shows the integral "O" rings 39 and 37 formed on backup diaphragm 35, while FIG. 5 shows "O" rings 39 and 37 integrally formed on chemically resistant diaphragm 40. The option chosen will depend on the materials chosen for the diaphragms, the size of the diaphragms and of the regulator, the service pressure intended, and the characteristics of the fluid being sealed. The preferred embodiment for flexible diaphragm 35 employs a thermoplastic elastomer while the chemically resistant diaphragm 40 employs a fluoropolymer.

The present invention successfully addresses all of the shortcomings previously noted. The major improvement over the prior art stems from employment of independent separate diaphragms for the chemical resistance requirements and for the flexibility and abrasion resistance requirements. The improved fit of the piston within the bore of the backup plate together with the increased guide length achieved by increasing the thickness of the backup plate improves alignment of the regulator components and reduces damage formerly attributable to misalignment and consequent high localized stresses. Provision of a coating on the piston and/or the bore of the backup plate provides resistance to fretting corrosion which can shorten regulator life. Finally, employing diaphragms having integrally formed sea rings simplifies assembly and assures proper placement of the rings.

Having described the invention, what is claimed is:

1. A fluid pressure regulator comprising:
   a body having a fluid inlet, a fluid outlet, and a fluid passage communicating therebetween;
   a variable valve positioned within said fluid passage and having an orificed seat and a closure element biased toward said orificed seat;
   means for adjusting a clearance between said seat and said closure element in order to control fluid outlet pressure;
   means, including first and second separate, imperforate, radially coextensive diaphragms in mutual flat service contact, for maintaining a substantially constant outlet pressure which is independent of fluctuations in fluid inlet pressure; and
   a plurality of annular thickened zones formed in at least one of the diaphragms for sealing between the first diaphragm and the valve stem and between the first diaphragm and the regulator housing body.

2. In a fluid pressure regulator of the type having a regulator body with a fluid inlet, a fluid outlet, and a fluid passage therebetween; a fluid flow valve orifice in the fluid passage, a valve closure element, a valve stem for controlling the closure element, a piston means reciprocably movable within a bore of a housing body cover for controlling the stem position, and diaphragm means for preventing leakage of the working fluid out of the fluid flow channel and for adjusting the position of the valve closure element in response to variations in the fluid inlet pressure, the improvement comprising:
   a first imperforate diaphragm coextensive with said first imperforate diaphragm having a high degree of flexibility and abrasion resistance positioned between said first diaphragm and the housing body cover;
   a plurality of annular thickened zones formed in at least one of said first and second diaphragms for sealing between the first diaphragm and the valve stem and the first diaphragm and the regulator body; and
   a bore of sufficient length within the housing body cover and of sufficiently close fit to the piston to prevent cocking of the piston within the bore.

3. The improvement of claim 2 wherein either the bore of the housing body cover or the outer cylindrical surface of the piston is provided with a plated metal coating so that contact is only between dissimilar metals, thereby protecting against fretting corrosion.

* * * * *